Sept. 15, 1953  S. DAVIDSON  2,652,530
ELECTROMAGNETIC INDUCTION METHOD AND
APPARATUS FOR LOCATING SUBTERRANEAN
ELECTRICALLY CONDUCTIVE BODIES
Filed Feb. 13, 1948  2 Sheets-Sheet 1
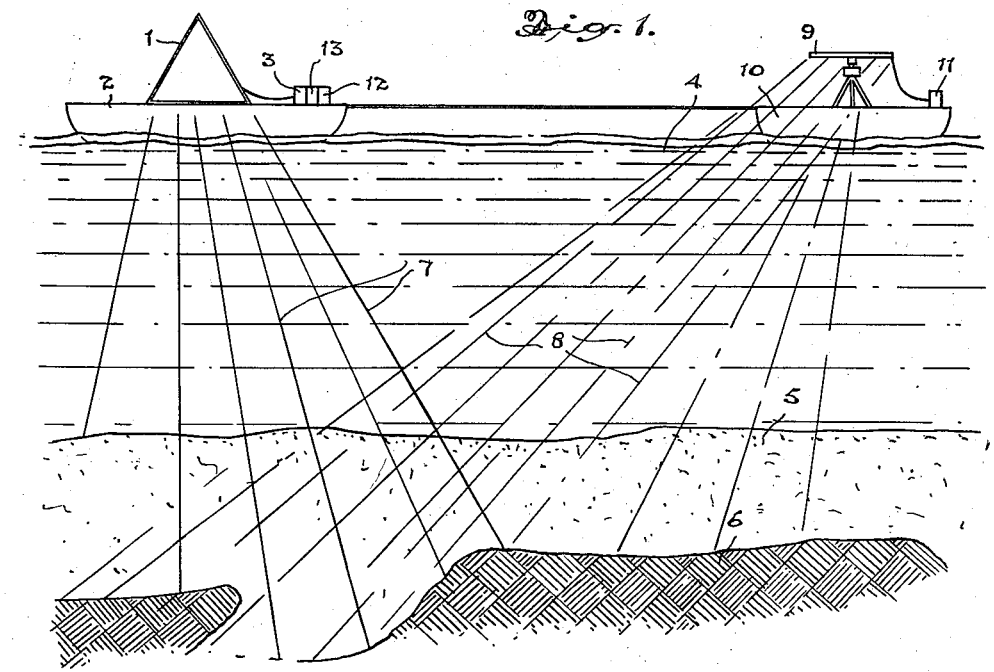
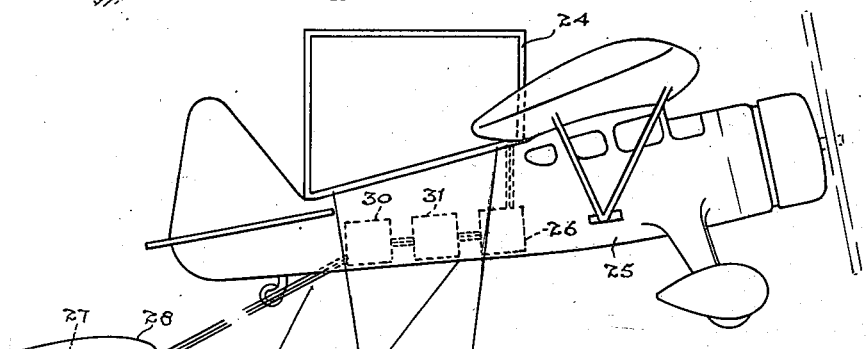
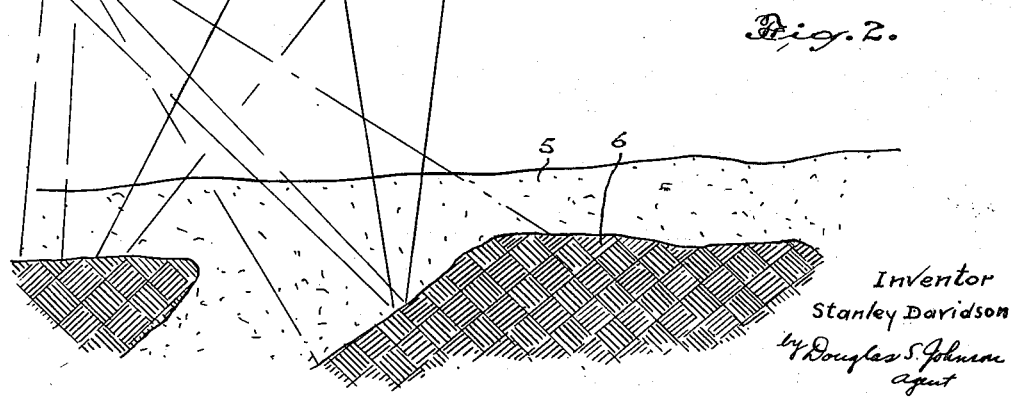
Inventor
Stanley Davidson Sept. 15, 1953   S. DAVIDSON   2,652,530
ELECTROMAGNETIC INDUCTION METHOD AND
APPARATUS FOR LOCATING SUBTERRANEAN
ELECTRICALLY CONDUCTIVE BODIES
Filed Feb. 13, 1948   2 Sheets-Sheet 2
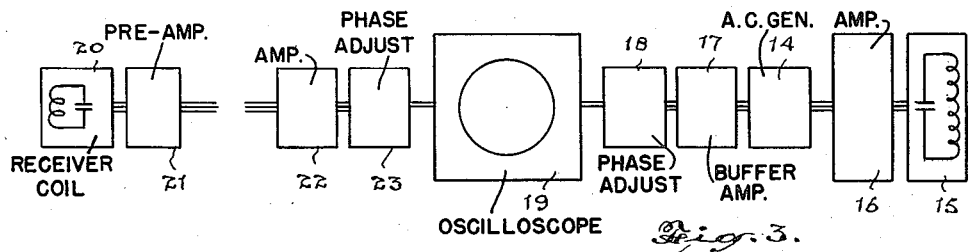
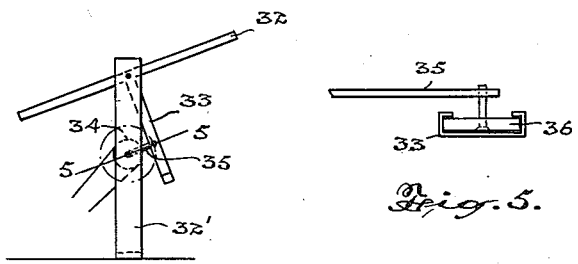
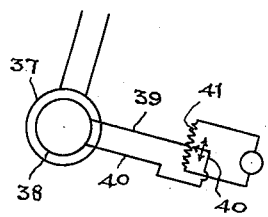
Fig. 4.   Fig. 7.
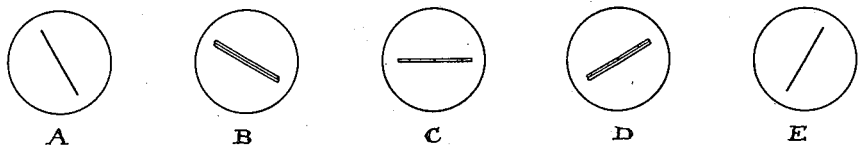
A  B  C  D  E
Fig. 8.
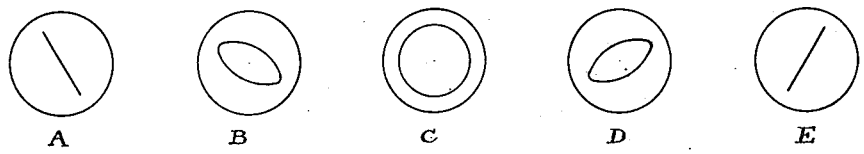
A  B  C  D  E
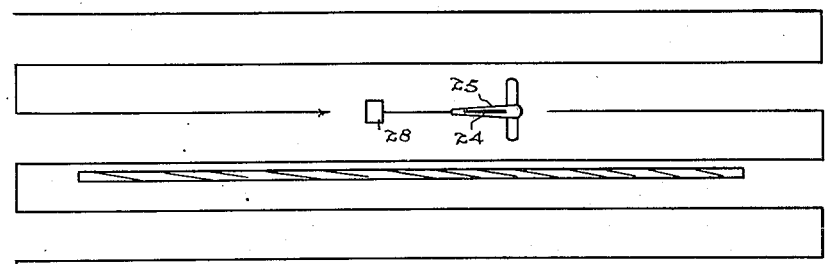
Fig. 9.
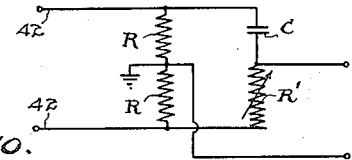
Fig. 10.
Inventor
Stanley Davidson
by Douglas S. Johnson
Agent Patented Sept. 15, 1953

2,652,530

UNITED STATES PATENT OFFICE 2,652,530

ELECTROMAGNETIC INDUCTION METHOD AND APPARATUS FOR LOCATING SUBTERRANEAN ELECTRICALLY CONDUCTIVE BODIES

Stanley Davidson, Sudbury, Ontario, Canada

Application February 13, 1948, Serial No. 8,236

6 Claims. (Cl. 324—6)

This invention relates to low frequency geophysical electro-magnetic induction prospecting methods and apparatus for detecting subterranean electrical conductor bodies, such as conducting ore bodies, and the principal object of the invention is to devise an extremely reliable method of electro-magnetic induction prospecting which can be carried out from a moving surface or aircraft, enabling a large area to be very quickly and thoroughly surveyed to determine the presence of buried conductors or crustal bodies of good conductivity, greatly reducing the time, expense and errors involved in present electro-magnetic prospecting methods.

A further important object is to provide a prospecting method which will enable the presence of subterranenan bodies of electrical conductivity to be detected in hitherto inaccessible areas by the use of aircraft.

A still further important object is to provide a sensitive and extremely reliable apparatus which will detect and give a continuous positive indication of the presence of a subterranean conductor while being moved over or above the earth's surface.

A still further and important object is to provide an electro-magnetic prospecting apparatus which will positively indicate the presence of a conductor body but will ignore random or anomalous electro-magnetic effects.

The principal feature of the invention consists in moving a transmitting coil and a pick-up coil on or above the surface of the earth by means of land, water or air craft, energizing the transmitting coil with a low frequency electrical source to create a magnetic field capable of penetrating overburden to set up in a buried conductor a current resulting in a secondary magnetic field of the same frequency but out of phase with the primary field, arranging the pick up coil to ignore the direct field from the transmitting coil and to respond to the secondary field, and utilizing the phase difference of the signal generated in the pick up coil by the secondary field in reference to the primary field as an indicator of the presence of such secondary field.

A further important feature consists in arranging the transmitting coil in a vertical plane and the pick up coil in a horizontal plane and towing the pick up coil at a distance behind the transmitting coil.

A further important feature consists in mechanically or electrically oscillating the pick up coil while being towed to ensure that it will pass through a null point with respect to direct pick up from the primary or transmitting coil.

A still further and important feature consists in comparing the primary field set up by the transmitting coil with the ninety-degree out of phase component of the secondary field on an oscilloscope to provide a positive visual indication which will be distinctive for such ninety-degree out of phase component.

A still further and important feature consists in mounting the pick-up coil in an air foil to permit the coil to be towed in a substantially horizontal plane behind an aircraft in which the transmitting coil is located.

With reference to the accompanying drawings, Figure 1 is an elevational view of one mode of carrying out my geophysical electro-magnetic inducting prospecting method employing surface craft.

Figure 2 is an elevational view of another mode of carrying out my invention using an aircraft.

Figure 3 is a block diagram of my electro-magnetic induction detector apparatus employed in carrying out my prospecting methods.

Figure 4 is an elevational view of a means for oscillating the pick-up coil about a transverse horizontal axis to ensure the coil passes through a null point with respect to the field set up by the transmitting coil.

Figure 5 is a sectional view on the line 5—5 of Figure 4.

Figure 6 is a schematic diagram of an electrical method replacing the method of Figure 4 for effecting a momentary cancellation of any direct pick-up from the transmitting coil by the pick-up coil.

Figures 7A to 7E are diagrammatic showings of the visual indications obtained with the oscilloscope of Figure 3 with no conductor present as the pick-up coil is oscillated about its horizontal axis.

Figures 8A to 8E are diagrammatic showings similar to Figure 7 but showing the indications obtained on the oscilloscope with a conductor present.

Figure 9 is a plan view showing a method of systematically investigating a large area for conductor bodies by the use of an aircraft.

Figure 10 is a schematic diagram of a phase shifter circuit which may be advantageously employed in the apparatus of Figure 3.

It has been found that if a coil or loop is energized by an alternating current source an alternating magnetic or commonly called electromagnetic field is set up and if this field becomes associated with nearby electrical conducting bodies such as crustal bodies of good electrical conductivity or metallic mineralization, circulating currents are induced in the conducting bodies. These circulating currents in turn give rise to an alternating current magnetic or electromagnetic field, often called the secondary field, which is of the same frequency as the field created by the coil often called the primary field.

A detector exploratory coil may then be used to determine the existence of the secondary field indicating the presence of a nearby conductor body.

Attempts have been made at utilizing this principle of electro-magnetic induction for determining the existence of buried or subterranean conductor bodies or metallic mineralization and coils have been set up at a given fixed station and measurements made in an attempt to determine the existence of a secondary field and measure its phase and magnitude.

The measurements must be very carefully made and are very liable to error in that secondary field may be extremely weak in comparison with the primary field or other anomalous fields and the direct pick-up of the primary field by the explanatory coil may completely hide the presence of the field or give misleading results. Further, the fixed station method is an extremely slow method of surveying an extensive area and finds its chief function in making surveys where metallic mineralizations or deposits are thought to be located.

The present invention has been devised to overcome the above difficulties associated with the fixed station method and to provide an electro-magnetic induction method of locating conductor bodies which method will give a continuous positively identifiable immediate indication of the presence of even weak secondary fields set up by a moving primary field yet which will ignore anomalous fields and direct pick-up from the moving primary field, enabling the presence of subterranean conductors to be quickly charted over extensive areas by means of land or water or aircraft.

My method utilizes the principle that if a primary field set up by an energized primary coil, say a vertical coil, becomes linked with a conducting body the current induced in such a body lags the original current by an amount depending on the resistivity of the body as well as its shape and size. This lagging current will have a component 90° out of phase with the primary field and a component in phase with the primary field, and this induced current gives rise to a secondary field which will have the same frequency as the primary field and will also have a 90° out of phase and an in-phase component relative the primary field. If a detector which will respond to only the 90° out of phase component of the secondary field, i. e. respond only to a field of the same frequency as the primary field but 90° out of phase therewith is employed, the direct field from the primary coil and any anomalous fields will be discriminated against and will not give rise to readings indicating falsely the presence of a conductor.

With reference to the accompanying drawings, Figure 1 shows my method being carried out with the use of water craft for exploring the surface beneath a body of water. As illustrated, a primary coil 1 is arranged vertically on a power-driven boat or scow 2 with the plane of the coil parallel with the centre line of the boat. The coil shown is of triangular form but may be rectangular or circular as desired, and this coil is energized by means of a low frequency generator and amplifier, shown in block form at 3.

The coil 1 is tuned to the frequency of the generator and the current therein creates an electro-magnetic primary field which penetrates down through the water 4 and the surface overburden 5 where, upon becoming associated with the layers or strata of metallic mineralization 6, it creates secondary currents which in turn give rise to a secondary electro-magnetic field. This secondary field will, as explained above, have a component in phase with the primary field and a component which will lag the primary field by 90°, the magnitude of the lagging component being determined by the resistivity size and shape of the body 6 in which the secondary currents are induced.

As illustrated in Figure 1, the primary field is indicated by the solid lines 7 and the secondary field is illustrated by the broken lines 8.

The exploratory or pick up coil 9 is in a horizontal plane mutually perpendicular to the plane of the primary coil 1. With this arrangement no currents will be induced in the pick up coil 9 by the field set up by the primary coil and the signal output of the pick up coil will be zero.

In practice it has been found that a certain amount of pick-up by the coil 9 unavoidably occurs and to reduce this pick up to a very low value the coil 9 is preferably separated from the coil 1 by an appreciable distance. Thus the coil 9 is shown mounted on a craft or scow 10 which is towed at some distance behind the powered boat 2. A distance of approximately two hundred feet between the scows has been found to give very good results.

The pick up coil 9 is of course tuned to the same frequency as the primary coil and as it becomes associated with a secondary field 8 a voltage or signal will be developed therein, and this voltage is amplified by a suitable pre-amplifier 11 located on the towed scow and the output of the pre-amplifier is fed to a suitable amplifier 12 which is preferably located on the powered scow.

The output of the amplifier 12 is then compared with a reference voltage fed back from the generator 3, by a phase shift detector, indicated in block form at 13 which will distinguish a phase shift between the reference voltage fed back from the generator and the amplified signal voltage produced in the pick up coil 2, as will later be described.

The conditions imposed on the generator 3 are that the frequencies utilized be relatively low to reduce absorption of the primary field by the overburden enabling deep conductor bodies to be located. Frequencies within or near the audio range have been found most effective for if the frequency of the primary field becomes too high it will be reflected at the earth's surface and will not penetrate to sub-surface conducting deposits.

The use of the vertical primary coil has been found as most effective in producing a primary field which will best couple with sharply dipping subterranean conductors and minimize absorption by the overburden. Results however could be obtained utilizing the horizontal primary coil for detecting horizontal conductors.

The precise manner in which the phase of the primary field and the secondary field is compared is illustrated in Figure 3 which illustrates in block form a low frequency generator 14 corresponding to the generator 3, energizing a tuned vertical primary coil 15 corresponding to the coil 1 through an amplifier 16. A reference voltage is also fed from the generator 14 through a buffer amplifier 17 and a phase-shifting circuit 18, shown in detail in Figure 10, to one set of plates of an oscilloscope 19.

The output from the tuned coil 20 corresponding to the horizontal pick up coil 9 is fed through its pre-amplifier 21 corresponding to the pre-amplifier 11 through a suitable amplifier 22 corresponding to the amplifier 12 and preferably through another adjustable phase-shifting circuit 23 to the opposite plates of the oscilloscope 19. For best results it is desirable that balanced circuits be employed to minimize any direct pick up of the primary field by the inductive elements of the circuits.

With the coils 15 and 20 mutually perpendicular there should be no pick up of the primary field by the coil 20. In practice however, a certain amount of pick up is experienced and one or other of the phase shifter circuits 18 and 23, or both circuits if desired, are adjusted so that the signal appearing on the oscilloscope with the reference voltage applied from the generator to the horizontal plates will be an inclined straight line when there is no conductor body within the vicinity. This adjustment is made in an area known to be free of conductors and the signal appearing will correspond to the diagrammatic showing of Figure 7B or 7D.

In the event the pick up coil 20 is cut by a secondary field set up by the primary coil 15 the 90° out of phase component of the secondary field will cause a signal which, when amplified and applied to the vertical plates of the oscilloscope, will transform the straight line oscilloscope image of Figure 7B or D to the elliptical configuration as illustrated in Figure 8B or D. Thus the instant that oscilloscope pattern changes from the straight line of Figure 7B or D to an ellipse a secondary field is known to exist and the presence of a conductor body determined.

Anomalous fields will only appear as noise on the oscilloscope, causing a thickening or distortion of the normal or straight-line pattern, and this noise can be ignored as it lacks intelligent interpretation and does not indicate the presence of a secondary field.

Thus with the oscilloscope detector all pick up by the coil 20, except the signal induced by a valid secondary field arising from the presence of a conductor body or zone, is discriminated against while such secondary field is positively identified.

Thus with the arrangement of Figure 1 the powered scow 2 can proceed at any desired speed and the phase shift detector 13 in the form of an oscilloscope, as shown at 19, will continuously indicate the existence or non-existence of a conductor zone beneath the water body and overlying overburden.

By making traversing sweeps back and forth across the body of water at spaced intervals the whole area may be charted for substerranean conductors. This same method can be utilized in conjunction with land craft and also equally well with air craft as illustrated in Figure 2.

It will be appreciated that this application of my prospecting method to an air craft is extremely important in that it enables vast hitherto unaccessible areas to be very quickly and accurately charted for the presence of sub-surface conductor zones or bodies and of course surface outcrops of conductor mineralization, the use of the phase shift detector principle giving continuous and instantaneous indications of such conductor zones.

As shown in Figure 2, a primary coil 24 is again vertical and of generally rectangular form, the plane of which coincides with the centre line of the aircraft 25. This primary coil 24 is energized by means of a low frequency alternating current generator the output of which is amplified by a suitable amplifier the generator and amplifier being indicated in block form at 26.

The horizontal pick up coil 27 is preferably separated some distance from the primary coil 24 and as illustrated is located in a suitable air foil 28 and is towed at some distance behind the aircraft.

Located with the pick up coil 27 and its mechanism for producing oscillation about a longitudinal horizontal axis (see Figure 4) is again a pre-amplifier 29 which feeds to a signal amplifier 30 located in the aircraft.

31 represents in block form the phase shift circuits and detector and as shown, a reference voltage from the generator is fed thereto and compared with the signal delivered from the amplifier 30.

One mode of carrying out a survey over a specified area is shown in Figure 9 where the aircraft is arranged to fly in traversing sweeps back and forth across the given area. When either a surface or subterranean conducting zone is approached or crossed the phase shift detector will give instantaneous and positive indication of same.

It will be understood that the use of the pre-amplifier is desirable in that it raises the level of the signal pick up by the secondary or pick up coil which will permit its transmission along the connecting cable to the signal amplifier.

As it is not possible to keep the primary and pick up coil always mutually perpendicular, which is the most sensitive position to detect phase shift, the pick up coil is preferably oscillated back and forth about a longitudinally horizontal axis slowly through the mutually perpendicular or null position. This may be done either physically or electrically. Figures 4 and 5 show an actual physical mechanical arrangement for rotating or tilting the pick up coil back and forth to ensure that at some period it passes through its most sensitive mutually perpendicular position.

As shown the coil 32 corresponding to the pick up coils 9 and 28 is pivotally supported from an upright 32', to rotate about a horizontal axis aligned toward the primary, and extending from the coil at right angles is an arm 33 in the form of a trackway.

A belt-driven fly wheel 34, also supported from the upright 32' carries an arm 35 provided with a roller 36 on its outward end which engages in the trackway of the arm 33. Thus as the fly wheel 34 rotates, rotating the arm 35, the arm 33 is rocked back and forth and oscillates the pick up coil 32 about a horizontal axis aligned along the line joining the primary and pick up coil.

Thus with the pick up coil being rocked the signal on the oscilloscope with no conductor present will be consecutively indicated, as illustrated in Figures 7A to 7E, Figure 7C indicating the signal as the pick up coil passes through the horizontal or mutually perpendicular null point, Figures 7A and 7E indicating the signal arising when the pick up coil is at its maximum angle of tilt out of the horizontal plane.

Again Figure 8 indicates the signal present on the oscilloscope in the presence of a conductor body or zone, Figure 8C indicating the oscilloscope signal obtained when the coil is in the horizontal null point, and Figures 8A and 8E indicating the signal observed when the coil is at its maximum angle of tilt. Figures 8B and 8D indicate the signal at intermediate tilts of the coil.

It will be noted that the fly wheel 34 is operated through a belt and this belt may be driven through a suitable air motor or other non-electrical device so that no question of pick up from an electric drive need be considered.

Where conditions would warrant, gyroscopic stabilization of the coils in their mutually perpendicular relation may be utilized, though this arrangement would be much more elaborate and more expensive than the simple oscillating or rocking movement of the pick up coil through its null position as described above. Also it would be possible for electrical servo motors, motivated by the primary field cutting the pick up coil to hold the pick up coil within same ½° or better of the horizontal.

An electrical method of electrically oscillating the pick up through its null position is illustrated in Figure 6. This method consists of subjecting the pick up coil indicated at 37 to an auxiliary field of the same frequency as the primary field but continuously varying in magnitude and passing through a 180° phase change at the zero point.

This arrangement is accomplished by utilizing a second auxiliary coil 38 adjacent the pick up coil 37, and applying a voltage which may be obtained directly from the low frequency generator to this auxiliary coil by means of the leads 39 and 40, the lead 39 being connected to an intermediate tap of a resistance 41 connected across the voltage source, while the conductor or lead 40 is oscillated by suitable means up and down the resistance 41 about the intermediate tap.

Thus it will be seen that the voltage applied to the coil 38 will vary from zero to a maximum value back through zero and through a phase shift of 180° again up to a maximum value. Thus at some intermediate point between zero and maximum the voltage applied to the coil 38 will set up a field that will be in opposition to and will exactly cancel the field or effect created in the pick up coil 37 by direct pick up from the primary energized coil.

Thus with this electrical oscillation of the pick up coil the oscilloscope will display, when no conductor is present, the various signals illustrated in Figure 7. In the presence of a conductor the signals indicated in Figure 8 will be presented on the oscilloscope screen.

Where it is desired to have a permanent record of the indications on the oscilloscope such indications may be photographed and the developed films later examined at leisure.

The oscilloscope has been found the most convenient means of indicating the presence of the secondary field. However it will be appreciated that any type of phase shift detector may be employed without departing from the scope of my invention.

The phase shifters 18 and 23 which are provided to adjust the signal on the oscilloscope to that of Figure 7A with no conductor present are merely the conventional circuit shown in Figure 10 comprising the two resistors R grounded at their junction and connected across the signal input terminals 42.

Connected in parallel with the resistors R is a condenser C and variable resistor R'. The output to the oscilloscope is taken between the junction of the condenser and the variable resistance and ground. The action of this circuit is well known and it will be readily understood that the phase of the signal input to the oscilloscope can be adjusted by varying the value of R'. For convenience the two phase shifter circuits 18 and 23 are employed, facilitating adjustment of the oscilloscope pattern.

With the use of my method of moving my apparatus over or above the earth's surface the presence of the conductor bodies hidden beneath the surface can be accurately determined. Fixed station surveys can then be carried out at the points or areas where hidden conductors are known to lie and more extensive information of their size and shape can be determined.

While my method is primarily concerned with the indication of the conductor body, it can also give an indication of the magnitude of the conductor body. That is, the presence of the secondary field will produce a circular configuration on the oscilloscope and this configuration will vary in shape from an ellipse to a circle, dependent upon the magnitude of the secondary field approaching a circle with large secondary magnetic fields. Thus the shape of the configuration of Figure 8C will indicate the extent of the subterranean conductor as well as its presence.

It may also be desirable to record the amplitude of the secondary field picked up by the detector or pick up coil by means of an amplifier and an Angus Esterline or similar recorder.

It will be understood that while I prefer to use the single pick up coil in obtaining the indication of the conductor a plurality of coils may be arranged in various relations and the signals picked up by the various coils due to a secondary field compared to give a more extensive indication of the characteristics of the conductor.

The best results are obtained when the pick up coil or coils are towed at some distance behind the energized coil, although it will be understood that both the energized and pick up coil can be located adjacent one another and on the same craft.

It will be understood that further various arrangements of the detecting apparatus may be made without departure from my method.

Also it should be noted that the same general method of detection but applying a vertical pick up coil, would apply with the use of a moving horizontal primary coil or larger horizontal loop end on the ground. Again it would be possible to provide a primary field by grounded electrodes and to explore the energized area by the detection methods utilizing a moving support such as I have outlined.

What I claim as my invention is:

1. An apparatus for detecting conductor bodies comprising a vertical primary coil and a horizontal pick-up coil mounted to rotate about a horizontal axis, means for oscillating said pick-up coil about said horizontal axis, a low frequency source for energizing said primary coil and a detector for measuring the phase angle between said electrical source and a voltage inducted in said pick-up coil by a secondary magnetic field set up by linking with a conductor body of a primary magnetic field resulting from the energizing of said primary coil.

2. An apparatus for detecting conductor bodies comprising a vertical primary coil and a pick-up coil oriented with respect to said primary coil whereby said coils are substantially mutually perpendicular, a low frequency electrical source for energizing said primary coil, means for ocsillating said pick-up coil through an electrical null with respect to pick up from said primary coil and a detector for measuring the prase angle between said electrical source and a voltage inducted in said pick-up coil by a secondary magnetic field set up by linking with a conductor body of a primary magnetic field resulting from the energizing of said primary coil.

3. An apparatus for detecting conductor bodies comprising a vertical primary coil and a horizontal pick-up coil mounted to rotate about a horizontal axis, means for oscillating said pick-up coil about said horizontal axis, a low frequency source for energizing said primary coil and an oscilloscope having two sets of deflector plates with a reference voltage from said source being supplied to one set of deflector plates and output voltage from said pick-up coil being applied to said other set of deflector plates.

4. An electromagnetic induction method of locating electrically conductive bodies consisting in creating a low frequency primary magnetic field to induce a secondary magnetic field in a conductor body, moving said primary magnetic field over the earth's surface, continuously detecting said secondary magnetic field set up by said primary magnetic field as said primary magnetic field is moved while ignoring said primary field and continuously comparing the detected secondary magnetic field with a reference signal from said primary magnetic field to determine variations of the phase angle therebetween as said primary magnetic field is moved.

5. An electromagnetic induction method of locating electrically conductive bodies consisting in creating a low frequency primary magnetic field to induce a secondary magnetic field in a conductor body and moving said primary field over the earth's surface, continuously detecting said secondary field while varying detection of said primary field through a null point as said primary field is moved, and continuously comparing the detected secondary magnetic field with a reference signal from said primary magnetic field to determine variations of the phase angle therebetween as said primary magnetic field is moved.

6. An electromagnetic induction method of locating electrically conductive bodies consisting in creating a low frequency primary vertical magnetic field to induce a secondary magnetic field in a conductive body with said secondary field including a horizontal field component, moving the source of said primary field over the earth's surface while continuously detecting the horizontal component of said secondary magnetic field and ignoring said primary magnetic field while maintaining the point of detection in substantially constant relation to the primary source throughout movement thereof and continuously comparing the detected secondary magnetic field horizontal component with a reference signal from said primary magnetic field to determine variations of the phase angle therebetween as said primary magnetic field is moved.

STANLEY DAVIDSON.

References Cited in the file of this patent

UNITED STATES PATENTS

| Number | Name | Date |
| --- | --- | --- |
| 2,104,440 | Statham et al. | Jan. 4, 1938 |
| 2,124,825 | Machts | July 26, 1938 |
| 2,424,772 | Rieber | July 29, 1947 |

| Number | Country | Date |
| --- | --- | --- |

OTHER REFERENCES

| 322,040 | Germany | June 19, 1920 |
| --- | --- | --- |

FOREIGN PATENTS

"Geophysical Exploration," Heiland, pages 30–32, 41, 696, 785, 804–807, pub. 1940, Prentice-Hall Inc.

"Engineering and Mining Journal," Dec. 1935, pp. 609–610, vol. 135, No. 12.

"A. I. M. E. Transactions," 1932, pp. 213, 214.